US012778843B2

(12) United States Patent
Lee et al.

(10) Patent No.: US 12,778,843 B2
(45) Date of Patent: Nov. 3, 2026

(54) LOW-FREQUENCY SONIC WAVE HEALTH CARE DEVICE AND LOW-FREQUENCY SONIC WAVE HEALTH CARE METHOD

(71) Applicant: TAIWAN OASIS TECHNOLOGY CO., LTD., New Taipei City (TW)

(72) Inventors: Ming-Shun Lee, New Taipei City (TW); Chin-Sung Tseng, New Taipei City (TW); Hsu-Hui Tseng, New Taipei City (TW); Hsien-Ching Tseng, New Taipei City (TW); Wei-Long Lee, New Taipei City (TW)

(73) Assignee: TAIWAN OASIS TECHNOLOGY CO., LTD., New Taipei City (TW)

( * ) Notice: Subject to any disclaimer, the term of this patent is extended or adjusted under 35 U.S.C. 154(b) by 178 days.

(21) Appl. No.: 18/352,761

(22) Filed: Jul. 14, 2023

(65) Prior Publication Data

US 2024/0342054 A1 Oct. 17, 2024

(30) Foreign Application Priority Data

Apr. 11, 2023 (TW) ................................ 112113480

(51) Int. Cl.
*A61H 39/00* (2006.01)

(52) U.S. Cl.
CPC ....... *A61H 39/00* (2013.01); *A61H 2039/005* (2013.01); *A61H 2201/102* (2013.01); *A61H 2205/083* (2013.01)

(58) Field of Classification Search
CPC .............. A61H 39/00; A61H 2039/005; A61H 2201/102; A61M 37/0092
See application file for complete search history.

(56) References Cited

U.S. PATENT DOCUMENTS 3,491,022 A 1/1970 Huff
5,101,810 A * 4/1992 Skille ................ A61H 23/0236 5/904

(Continued)

FOREIGN PATENT DOCUMENTS

CN 202724475 U 2/2013
CN 208726556 U 4/2019

(Continued)

OTHER PUBLICATIONS

The Effects of Essential Oils and Terpenes in Relation to Their Routes of Intake and Application, Koyama et al. (Year: 2020).*

(Continued)

*Primary Examiner* — Erin Mcgrath
(74) *Attorney, Agent, or Firm* — MUNCY, GEISSLER, OLDS & LOWE, P.C.

(57) ABSTRACT

A low-frequency sonic wave health care device illustrated has a low-frequency sonic wave emitter, a low-frequency sonic waveguide and a plant essential oil carrier disposed between the low-frequency sonic wave emitter and the low-frequency sonic waveguide. The low-frequency sonic wave emitter emits a low-frequency sonic wave with a predetermined frequency, and the low-frequency sonic wave firstly passes through the plant essential oil carrier, and then propagates to the low-frequency sonic waveguide. Next, energy of the low-frequency sonic wave is focused in the low-frequency sonic waveguide, and then the low-frequency sonic wave is emitted out from the low-frequency sonic waveguide. A low-frequency sonic wave health care method illustrated emits the low-frequency sonic wave with the predetermined frequency to a belly button of a user by using the low-frequency sonic wave health care device. The low-frequency sonic wave health care device and method increase contents of $NAD^+$ in blood of the user, and achieve effects of convenient operation, accurate use position iden- (Continued)

tification, and non-invasive and non-contact low-frequency sonic wave health care.

2 Claims, 7 Drawing Sheets

(56) References Cited

U.S. PATENT DOCUMENTS

| | | | | |
|---|---|---|---|---|
| 5,318,503 | A * | 6/1994 | Lord | A61M 21/00 600/27 |
| 6,063,894 | A | 5/2000 | Phipps et al. | |
| 10,449,348 | B2 * | 10/2019 | Paunescu | A61P 43/00 |
| 10,806,942 | B2 | 10/2020 | Hochstenbach | |
| 11,344,741 | B2 | 5/2022 | Hochstenbach | |
| 11,826,579 | B2 | 11/2023 | Hochstenbach | |
| 2010/0166613 | A1 * | 7/2010 | Hyde | A61B 5/411 422/84 |
| 2022/0266046 | A1 * | 8/2022 | Giles | A61F 7/0053 |
| 2022/0339062 | A1 * | 10/2022 | Chung | A61H 39/002 |
| 2022/0401299 | A1 * | 12/2022 | Tsai | G16H 20/40 |

FOREIGN PATENT DOCUMENTS

| | | | |
|---|---|---|---|
| CN | 215082015 | U | 12/2021 |
| CN | 217661124 | U | 10/2022 |
| EP | 3970507 | A1 | 3/2022 |
| FR | 2776932 | A1 | 10/1999 |
| TW | 202142211 | A | 11/2021 |
| TW | 202142213 | A | 11/2021 |
| TW | 202142220 | A | 11/2021 |
| TW | M643521 | | 7/2023 |
| WO | WO2018089795 | A1 | 5/2018 |

OTHER PUBLICATIONS

Office Action with First Search Report for Corresponding German Application No. 10 2023 119 004.0 on Feb. 28, 2024.

"Low-frequency vibration promotes AMPK-mediated glucose uptake in 3T3-L1 adipocytes, Daijiro Haba, Gojiro Nakagami, Takeo Minematsu, Hiromi Sanada, Heliyon (2021) 1-7".

"AMP-activated protein kinase regulates nicotinamide phosphoribosyl transferase expression in skeletal muscle, J. Brandauer et al., J Physiol. Oct. 15, 2013; 591(Pt 20): 5207-5220".

"Effects of low frequency magnetic fields on Na,K-ATPase activity, M. Blank, L. Soo, V. Papstein, Bioelectrochemistry and Bioenergetics 38 (1995) 267-273".

"Effects of Essential Oils on Telomere Length in Human Cells, Plant J, Plant, Med Aromat Plants 2016, 5:2".

"NAD-Linked Metabolism and Intervention in Short Telomere Syndromes and Murine Models of Telomere Dysfunction, Amanda J Stock and Yie Liu, Front Aging. 2021; 2: 785171".

Office Action with Search Report for Corresponding Taiwanese Patent Application No. 112113480 on Aug. 30, 2023.

* cited by examiner

LOW-FREQUENCY SONIC WAVE HEALTH CARE DEVICE AND LOW-FREQUENCY SONIC WAVE HEALTH CARE METHOD

TECHNICAL FIELD

The present disclosure relates to a low-frequency sonic wave health care device and a low-frequency sonic wave health care method, and in particular to, a low-frequency sonic wave health care device and a low-frequency sonic wave health care method, each of which emits a low-frequency sonic wave which passes through the plant essential oil carrier and then propagates to the human body.

RELATED ART

Known low-frequency sonic wave health care at present for example comprises scraping, cupping, acupuncture, massage etc., although the purpose of low-frequency sonic wave health care can be achieved, there are still shortcomings. For example, scraping may make skin damaged, and increases the risk of infection. Effect of cupping is similar to that of scraping, but the used cup must contact the skin, so the cleanliness and hygiene of the cup is a concern. Acupuncture uses needles to penetrate the corresponding acupoints of the human body, so there is an invasive risk. Although massage has no invasive risk, it relies on other persons to help relax the muscles.

The low-frequency sonic wave health care of acupuncture is improved by others, and a microwave acupuncture instrument which adopts the low-frequency sonic wave health care device emitting non-invasive radiation waves to human acupoints is proposed. An oscillation frequency of the radiation waves emitted by the microwave oscillator in the microwave acupuncture instrument is 1000 MHz to 2000 MHz. The oscillation frequency is very high, so that it is very easy to cause damage due to excessive radiation (energy). In practice, to achieve the desired effect of low-frequency sonic wave health care, the propagating directions of the radiation waves of the microwave acupuncture instrument also must align to corresponding acupoints of the human body. However, most people are not professionals related to traditional Chinese medicine and cannot accurately identify each person's individual acupoints. Therefore, the microwave acupuncture instrument is not actually a universal and wide-used low-frequency sonic wave health care device.

Therefore, it is a trend in the industry to develop a low-frequency sonic wave health care device and a low-frequency sonic wave health care method that can achieve effects of convenient operation, accurate use position identification, non-invasive treatment, non-contact treatment, and no harm caused by excessive energy risk.

SUMMARY

The present disclosure is mainly based on recognizing that the main tissues and organs of the human body (referring to organisms, rather than artificial tissues or organs) have inherent oscillation frequencies, such as 8-12 Hz for the head, 4-6 Hz for the thorax, and 5 Hz for the heart, 6-9 Hz for the abdominal cavity, 1.2 Hz for the blood flow, and 1.8 Hz for the bone tissue. When a certain part of the human body is in the low-frequency sonic wave field of 0-20 Hz, for example, the low-frequency sonic electromagnetic wave, or s a low-frequency sonic sound wave or infrasonic (by contrast, the sound is called the ultra-high-frequency sound or ultrasonic if the frequency is higher than 20 KHz), if its sound pressure level (the unit is dB) reaches a certain threshold, the elastic wall of the outer layer of the tissue and organ corresponding to this part will first enter a vibration state, and then the vibration will be transmitted to the interior of the tissue and organ. In particular, resonance occurs when the frequency of the infrasonic is synchronized with the inherent oscillation frequency of the tissues and organs, and the tissues and organs receive the greatest stimulation at this time. When the resonance caused by infrasonic acts on tissues and organs, it also acts on the cell structures of tissues and organs, such as the mitochondrion of the cell, which is the main place of the oxidative phosphorylation and synthesis of adenosine triphosphate (ATP) in cells. The mitochondrion in the cells can provide chemical energy for cell activities, so the mitochondrion is also called the powerhouse of the cell.

The ATP relates to membrane potential (i.e., transmembrane potential or membrane voltage) of a cell membrane, and the cell membrane is a thin film which formed by a lipid bilayer (i.e., a phospholipid bilayer). The cell membranes of most livings are mainly formed by the lipid bilayers, and interior of the lipid bilayer is filled with dielectric material, and thus the cell membrane formed by the lipid bilayer is electrically equivalent to a capacitor. In addition to the lipid layer, the structure of the cell membrane further comprises proteins, some of which act as ion channels to allow ions (such as positively charged sodium ions $Na^+$ and potassium ions $K^+$) to transport across the cell membrane. This phenomenon can be understood in physics, and that is, the capacitor of the cell membrane is a leakage capacitor, and the leakage current (ion transport) passes through the capacitor.

The resonance action that aforementioned infrasonic causes also can influence the effect of adenosine monophosphate-activated protein kinase (AMPK), about the relation of low-frequency sonic vibration and AMPK, it can be referred to "Low-frequency sonic vibration promotes AMPK-mediated glucose uptake in 3T3-L1 adipocytes, D. Haba et al., Volume 7, Issue 9, September 2021". Activated AMPK increases nicotinamide phosphoribosyltransferase (NAMPT), and thus nicotinamide adenine dinucleotide ($NAD^+$) increases. The above association can be referred to "AMP-activated protein kinase regulates nicotinamide phosphoribosyl transferase expression in skeletal muscle, J. Brandauer et al., J Physiol. 2013 Oct. 15; 591 (Pt 20): 5207-5220". Furthermore, since $NAD^+$ is one of the keys to synthesize ATP, once the amount of $NAD^+$ increases, the amount of ATP will also increase.

Further, when the resonances caused by the above infrasonic are applied to the mitochondrion, it affects the binding state of some enzymes, such as ATPase, to the cell membrane and the activities of the enzymes. The ATPase is an enzyme that can decompose ATP to generate energy, and can activate $Na^+$ and $K^+$, so it is also called $Na^+$—$K^+$ ATPase or $Na^+$—$K^+$ pump ($Na^+$—$K^+$ pump). The $Na^+$—$K^+$ pump can regulate concentration of sodium ions and potassium ions inside and outside of the cell membrane, such that the membrane potential can be adjusted, for example, returning from action potential to resting membrane potential. First, the cell membrane is at the resting membrane potential, and then the cell membrane at the resting membrane potential is properly stimulated to generate the action potential by the following stages of polarization, depolarization, and repolarization and hyperpolarization, especially during the hyperpolarization stage, the membrane potential of the action potential will be lower than the resting membrane potential. At this time, $Na^+$—$K^+$ pumps must be relied on to assist the membrane potential of the action potential during the hyperpolarization stage to the resting membrane potential. It can be understood that long-term stimulation (such as stress) or long-term human inflammation, or long-term lack of ATP and/or ATPase, will cause cells to be in a hyperpolarized stage for a long time, so that the membrane potential will be lower than the resting membrane potential.

Based on the aforementioned understanding that the cell membrane is equivalent to a capacitor (or battery) in electrical properties, the membrane potential is equivalent to the voltage of the battery, and the membrane potential of the action potential during the aforementioned hyperpolarization stage will be lower than the resting membrane potential, wherein the membrane potential of the action potential in the hyperpolarization stage can be understood as the residual power (voltage) after the battery has been depleted after being used, and the resting membrane potential can be corresponding to the initial power (voltage) that is not consumed or recharged. According to statistics, there are 37.2 trillion cells on average in the human body, in other words, there are 37.2 trillion "batteries" in the human body on average. It can be understood that when the body is under long-term stress or inflammation, the cells are correspondingly in the state of "battery power consumption" in the hyperpolarization stage for a long time, so the cells cannot perform or maintain their proper functions, and human tissues and organs also present pathological phenomena or people present fatigue. However, if the low-frequency sonic wave of a certain intensity and/or frequency acts on the cell at this time, the energy of the wave can be converted into thermal energy, biochemical energy and bioelectric energy, so as to increase the activity of ATPase, thereby affecting the activity of ATPase In the hyperpolarization stage, and the membrane potential of the action potential is restored to the resting membrane potential, which makes the aforementioned "battery" corresponding to human cells return to the initial power (voltage) of the full power of the resting membrane potential from the "battery power consumption" state of the membrane potential during the aforementioned hyperpolarization stage. In other words, the low-frequency sonic wave can "charge" the cells in the hyperpolarization stage, and the low-frequency sonic wave can act on the tissues and organs, so that the damaged tissue can be in repaired under the stimulation of the low-frequency sonic wave and restore normal functions. One of the examples about the relationship between low-frequency sonic waves and organisms, for example, the extremely low frequency (ELF) of Schumann resonance frequency of the low-frequency sonic wave is 7.83 Hz, and exactly, the same as the frequency of the hippocampus of the mammalian brain, especially the alpha wave and theta wave of the human brain are also close to 8 Hz, so the US National Aeronautics and Space Administration (NASA) installs a Schumann wave generator in the manned space capsule to maintain the physical and mental health of astronauts in space. About using the low-frequency sonic wave to increase the ATPase activity, it can refer to "Effects of low frequency magnetic fields on Na, K-ATPase activity, M. Blank, L. Soo, V. Papstein, Bioelectrochemistry and Bioenergetics 38 (1995) 267-273", wherein the low-frequency sonic wave (magnetic wave) of 0-70 Hz increases the activity of $Na^+$—$K^+$ ATPase by 5-10%. In other words, the low-frequency sonic wave can activate cells and "charge" cells in the hyperpolarization stage, so the low-frequency sonic wave can be applied to "cell activation technology". It is specifically stated here that the low-frequency sonic wave may also include an electromagnetic wave, such as an electric wave, a magnetic wave, or a light wave, or an infrasonic.

Therefore, it can be known that the aforementioned infrasonic has caused the increase of the amount and/or activity of ATP and/or ATPase. Then, since ATPase hydrolyzes ATP and generates energy, helicases can use the energy generated by the hydrolysis to perform deoxyribonucleic acid (DNA) unwinding on double helix of DNA, so as to unwind the double helix structure of the DNA. Thus, DNA polymerase can carry out DNA replication successfully, so that in addition to helping cell division, it repairs damaged genes.

In the present disclosure, it is recognized that according to the theory of traditional Chinese medical science, the belly button of human body is the Shenque acupoint and is the place where Ren meridian, Du meridian, Dai meridian, and Chong meridian pass through, so when stimulating Shenque acupoint, the whole body can be adjusted by the meridians connecting the internal organs. Furthermore, according to the theory of modern medicine, the belly button is the thinnest part of the cuticle of the epidermis in the abdomen and there is no fat tissue under the belly button, so its barrier function is the weakest. In addition, the belly button skin also has abundant venous network and hypogastric artery branch except the microcirculation blood vessel that the general skin also has. Therefore, as long as some effect or change is carried out to the blood in the belly button skin microcirculation vessel, this effect or change can be brought into the human blood circulation system. Moreover, the belly button of the human body is easy to identify its position and will not vary depending on the height, fat or thinness of the person. Therefore, using the belly button as the corresponding position which the low-frequency sonic wave health care device acts on the human body will allow the user to accurately identify and use it.

In the present disclosure, it is recognized that the used low-frequency sonic wave emitter which can generate the low-frequency sonic wave (such as low-frequency sonic electric wave, low-frequency sonic magnetic wave, and low-frequency sonic sound wave) is not in contact with the belly button, and the low-frequency sonic wave emitter which emits low-frequency sonic wave is disposed toward the belly button to achieve the effect similar to acupuncture, so that a non-invasive and non-contact low-frequency sonic wave health care method can be achieved. Preferably, the used infrasonic emitter that can generate infrasonic is not in contact with the belly button, and the infrasonic emitter that emits the infrasonic is disposed toward the belly button to achieve the effect similar to acupuncture, so that a non-invasive and non-contact low-frequency sonic wave health care method can be achieved. It is noted that, the infrasonic in the present disclosure is a low frequency acoustic wave. If the low-frequency sonic wave emitter is directly used as the component of the low-frequency sonic wave health care device, the problem of excessive energy risk caused by the high-frequency microwave oscillator can be avoided, and at the same time, it can also avoid the adverse effects of electric waves or magnetic waves on some people with special constitutions. Therefore, the effect similar to acupuncture and moxibustion achieved by the present disclosure can also be called "qigong moxibustion".

Since it is recognized that the infrasonic can achieve the effect similar to that of acupuncture ("qigong moxibustion"), and the effect of acupuncture on the immune system is that acupuncture can increase the content of interferon gamma (y-IFN) and neuropeptide beta-endorphin (B endorphin), so as to activate NK cells (natural killer cells), wherein the NK cells secrete cytokines, and cytokines regulates the inflammatory response. The NK cells are immune cells with large granules in the cytoplasm, developed from bone marrow lymphoid stem cells, mainly distributed in peripheral blood (including blood in microcirculation blood vessels) and spleen. There also a small presence of the NK cells in lymph nodes and other organization.

As mentioned above, the belly button is the thinnest part of the cuticle of the epidermis in the abdomen and there is no fat tissue under the belly button, so its barrier function is the weakest. In addition, the belly button skin also has abundant venous network and hypogastric artery branch except the microcirculation blood vessel that the general skin also has. Therefore, as long as some effect or change is carried out to the blood in the belly button skin microcirculation vessel, this effect or change can be brought into the human blood circulation system. Accordingly, when the infrasonic emitter emits the infrasonic toward the belly button, it will trigger an effect similar to that of the acupuncture, which will increase the content of γ-IFN and β endorphins in the blood of the belly button skin microcirculation blood vessels and activate NK cells, B cells (B lymphocytes) and active T cells (active T lymphocytes), and because NK cells, B cells and active T cells are activated, they secrete cytokines, therefore regulating inflammation or secreting antibodies. The manner that improves the content of endorphin can also be, to make aforesaid infrasonic be acted on the container that essential oil is housed, so as to make the essential oil in container produce agitation (refer to U.S. Patent U.S. Pat. No. 6,063,894A or European Patent EP3970507A1). Thus, the essential oil odor molecules are accelerated to leave the container and are transmitted to the olfactory nerve and to the limbic system of the brain, thereby increasing the amount of endorphins secreted and activating NK cells, B cells and activating T cells. Moreover, the essential oil is that the cells near the glands of plants synthesize via photosynthesis, so the leaves of most plants all contain essential oils, or the essential oils produced in leaves can enter the glands through cell walls and be stored in other parts of plants. Therefore, the above-mentioned infrasonic acting on plants will also cause the essential oils stored in the plants to dissipate into the air (refer to US Patent U.S. Pat. No. 3,491,022A, it relates to the effect of reverse osmosis produced by infrasonic), and the dissipated essential oil is transmitted to the olfactory nerve and then to the brain The limbic system can increase the amount of endorphins secreted to activate NK cells, B cells and activate T cells. When the aforesaid infrasonic acts on the leaf and other parts of the plant that contains enough moisture, it can produce the effect of unwinding the DNA double helix structure as previously mentioned.

In addition, in the present disclosure, it is recognized that $NAD^+$ and/or essential oils can protect telomeres, and the association between essential oils and telomeres can be referred to "Effects of Essential Oils on Telomere Length in Human Cells, Plant J, Plant, Med Aromat Plants 2016, 5:2", and the association between $NAD^+$ and telomeres can be referred to "NAD-Linked Metabolism and Intervention in Short Telomere Syndromes and Murine Models of Telomere Dysfunction, Amanda J Stock and Yie Liu, Front Aging. 2021; 2: 785171".

In addition, when launching infrasonic emitter to emit the infrasonic toward the belly button, the activity of $Na^+$—$K^+$ ATPase for activating T cells in the belly button skin microcirculation blood vessels increases, so the activity of active T cells can be improved. In other words, when the infrasonic emitter emits the infrasonic toward the belly button, the active T cell with low activity can be "charged" to restore its activity, so that the active T cell after being "charged" can be re-tested and detected. Thus, the efficacy of the low-frequency sonic wave health care device of the present disclosure can be verified if the content changes of NK cells, B cells or active T cells in the blood are detected. Certainly, the ability of NK cell strain for poisoning cancer cell strain (K562) can be used to verify the results of the present disclosure, for example, effector to target cell ratio (E/T ratio) of the NK cell mixed with culture samples can be used to detect ability of poisoning, and the difference of the results can be compared to verify the feasibility of the low-frequency sonic wave health care device and method of the present disclosure.

As mentioned above, the aforementioned infrasonic can make the amount of $NAD^+$ increase to increase the amount of ATP, and the increase of the amount and/or activity of ATP and/or ATPase helps the DNA unwinding, so the double helix structure of DNA is prone to be unwound for cell division. Therefore, as long as the content changes of $NAD^+$, NK cells, B cells or activated T cells in the blood are detected, the efficacy of the low-frequency sonic wave health care device of the present invention can be verified.

Based on the above explanations, the present disclosure provides a low-frequency sonic wave health care device, and the low-frequency sonic wave health care device comprises a low-frequency sonic wave emitter, a plant essential oil carrier and a low-frequency sonic waveguide. The plant essential oil carrier is disposed between the low-frequency sonic wave emitter and the low-frequency sonic waveguide. The low-frequency sonic wave emitter is configured to emit a low-frequency sonic wave with a predetermined frequency. The low-frequency sonic wave firstly passes through the plant essential oil carrier and then propagates to the low-frequency sonic waveguide, and next, energy of the low-frequency sonic wave is focused in the low-frequency sonic waveguide, and then the low-frequency sonic wave is emitted out from the low-frequency sonic waveguide.

In one embodiment of the present disclosure, the plant essential oil carrier comprises a plant essential oil.

In one embodiment of the present disclosure, the plant essential oil carrier is a part of a plant that contains the plant essential oil, or the plant essential oil is loaded in a container, or the plant essential oil is adsorbed on an adsorbed substance.

In one embodiment of the present disclosure, the predetermined frequency is 1.27 Hz to 1.81 Hz.

In one embodiment of the present disclosure, the low-frequency sonic waveguide comprises a column part and/or a conical portion, and the column part or the conical portion is formed with an accommodating space therein, and the accommodating space accommodates the plant essential oil carrier.

In one embodiment of the present disclosure, the low-frequency sonic wave health care device is installed on a frame, and located at a predetermined location in front of a belly button of a user with a predetermined distance, and the predetermined distance is 5 cm to 8 cm.

In one embodiment of the present disclosure, the low-frequency sonic waveguide is located at the predetermined location.

In one embodiment of the present disclosure, after the energy of the low-frequency sonic wave is focused in the low-frequency sonic waveguide and then emitted out from the low-frequency sonic waveguide, the low-frequency sonic wave propagates toward the belly button, and then reaches the belly button.

Based on the above explanations, the present disclosure provides a low-frequency sonic wave health care method, and the low-frequency sonic wave health care method comprises using a low-frequency sonic wave health care device located at a predetermined location in front of a belly button of a user with a predetermined distance to emit a low-frequency sonic wave with a predetermined frequency, wherein the predetermined distance is 5 cm to 8 cm. The used low-frequency sonic wave health care device can one of the above mentioned low-frequency sonic wave health care devices.

In one embodiment of the present disclosure, the predetermined frequency is 1.45 Hz.

To sum up, the low-frequency sonic wave health care device and the low-frequency sonic wave health care method provide by the present disclosure can achieve effects of convenient operation, accurate use position identification, non-invasive treatment, non-contact treatment, and no harm caused by excessive energy risk.

BRIEF DESCRIPTIONS OF DRAWINGS

The accompanying drawings are included to provide a further understanding of the present disclosure and are incorporated in and constitute a part of this specification. The drawings illustrate exemplary embodiments of the present disclosure and, together with the description, which are used to explain the principles of the present disclosure.

DETAILS OF EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1:
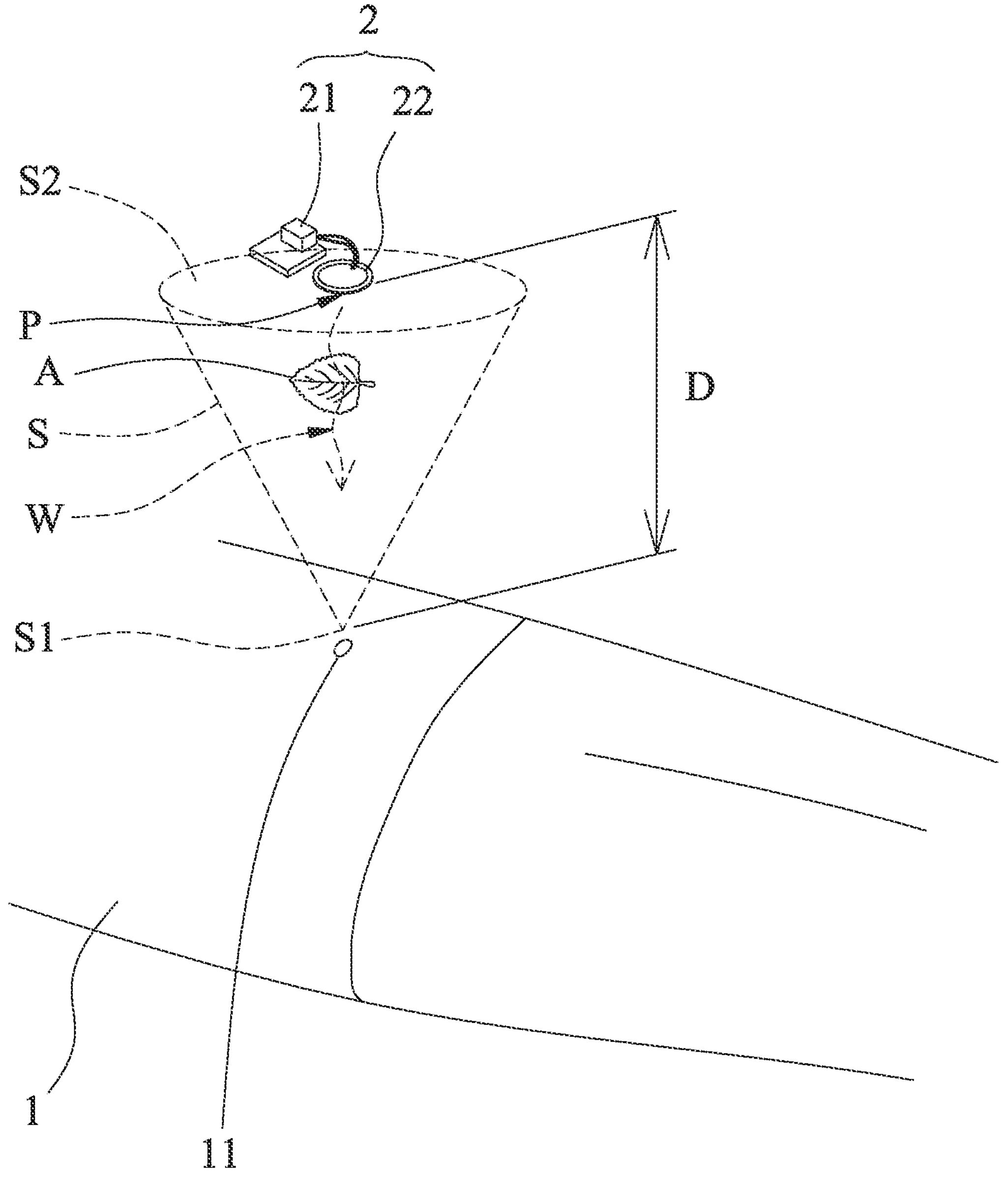
FIG. 1 is a schematic diagram of executing a low-frequency sonic wave health care method according to an embodiment of the present disclosure.

Refer to FIG. 1, the present disclosure provides a low-frequency sonic wave health care method. The method arranges a low-frequency sonic wave emitter 2 at a predetermined location P in front of a belly button 11 of a user 1 with a predetermined distance D and makes the low-frequency sonic wave emitter 2 emit a low-frequency sonic wave W with a predetermined frequency toward the belly button 11 of the user 1. The aforementioned "front" refers to the front of a human body in a direction of a human abdomen, and correspondingly, the "back" refers to the back of the human body. The predetermined location P is located on a virtual bottom surface S2 of a virtual pyramid S, and the belly button 11 is a virtual vertex S1 of the virtual pyramid S. The predetermined distance D is designed to be not larger than 8 cm, or the predetermined distance D is designed to be not less than 5 cm, or the predetermined distance D is designed to be within a range between 5 cm and 8 cm (p.s. the range comprises two end values of 5 cm and 8 cm). Preferably, the predetermined location P is located on the center of the virtual bottom surface S2, for example, the virtual pyramid S is a circular cone, the predetermined location P is located on the circular center of the virtual bottom surface S2 being a circle surface, and the predetermined distance D is the distance between circular center and the belly button 11, which is within the range between 5 cm and 8 cm. A plant essential oil carrier A is disposed between the predetermined position P and the virtual vertex S1. The plant essential oil carrier A comprises a plant essential oil, and the plant essential oil refers to the volatile oily substance at room temperature, which can be stored in plants or obtained by plants, so the plant essential oil carrier A can be a part containing the plant essential oil, and the part t containing plant essential oil may be a root, a stem, a leaf, a flower, a fruit and a seed, for example the leaf of *plectranthus amboinicus*. The plant essential oil carrier A can also be that the plant essential oil obtained by various plants through known distillation or extraction is loaded in a container, or adsorbed on an adsorbate such as cotton or paper. The plant essential oil can be at least one of tea tree oil, bitter refining oil, left-hand sesame oil, lemon oil, oil of wintergreen, camphor tree oil, clove oil, peppermint oil, *eucalyptus* oil, citronella oil, *chrysanthemum* oil, clary sage oil, *eucalyptus* oil, rose oil, jasmine oil, geranium oil, rose geranium oil, ylang-ylang oil, frankincense oil, patchouli oil, rosemary oil, helichrysum oil, thyme oil, pine oil, cedar oil, juniper oil, sandalwood oil, basil oil, lime oil, tangerine oil, sweet orange oil, petitgrain oil, petitgrain oil, neroli oil, citrus oil, *litsea* pepper oil, hyssop oil, *melaleuca* oil or ginger oil. The low-frequency sonic wave W propagating toward the belly button 11 firstly passes through the plant essential oil carrier A and then reaches the belly button 11.

The low-frequency sonic wave emitter 2 is preferably an infrasonic transducer, and the low-frequency sonic wave W can be the infrasonic. The structure of the infrasonic transducer comprises a power supply 21 and a vibration part 22. The vibration part 22 is electrically connected to the power supply 21. The vibration part 22 is a disc-shaped piezoelectric ceramic transducer. The piezoelectric ceramic transducer is made of piezoelectric material polarized in the thickness direction. The power supply 21 provides power to the vibration part 22 to make the vibration part 22 vibrates in the thickness direction to generate the infrasonic with the predetermined frequency. In the present disclosure, the predetermined frequency is not larger than 1.81 Hz, or the predetermined frequency is not less than 1.27 Hz, or the predetermined frequency is within a range between 1.27 Hz and 1.81 Hz (p.s. the range comprises two end values of 1.27 Hz and 1.8 Hz). Preferably, the predetermined frequency is 1.45 Hz.

In other words, the present disclosure also provides a low-frequency sonic wave health care device, the low-frequency sonic wave health care device is arranged at a predetermined location P in front of the belly button 11 of the user with a predetermined distance D. The low-frequency sonic wave health care device at least comprises a low-frequency sonic wave emitter 2.

<Detection Manner and Effect of Experiment 1>

In Embodiment 1 of the following TABLE 1, the low-frequency sonic wave health care method is executed to personnel A1 and personnel A2, the predetermined distance D is selected to be 5 cm, the predetermined frequency is selected to be 1.45 Hz, and the low-frequency sonic wave is selected to be the infrasonic. The personnel A1 is a 74-years old man, the personnel A2 is a 72-years old woman. Before executing the low-frequency sonic wave health care method, blood samples are drawn from the personnel A1 and personnel A2 and sent to the medical laboratory for immunological examination to check the percentage (i.e., content) of the active T cells. On the 19-th day after the execution of the low-frequency sonic wave health care method for 2 hours, the blood sample of the personnel A1 is again taken and sent to the medical laboratory for immunological examination, and on the 42-nd day after the execution of the low-frequency sonic wave health care method for 2 hours, the blood sample of the personnel A2 is also taken again and sent to the medical laboratory for immunological examination. The percentages of the active T cells of the blood samples are examined in the same way, and the results are recorded in TABLE 1 which is described later. In TABLE 1, the difference between Embodiment 1 and Comparative Example 1 is that the plant essential oil carrier A is not used in Comparative Example 1.

TABLE 1

| CONTENT OF ACTIVE T CELLS | PERSONNEL A1 BEFORE EXECUTION | PERSONNEL A1 AFTER EXECUTION | PERSONNEL A1 CHANGE RATE = CONTENT OF ACTIVE T CELLS AFTER EXECUTION/ CONTENT OF ACTIVE T CELLS BEFORE EXECUTION |
|---|---|---|---|
| COMPARARTIVE EXAMPLE 1 | 6.2% | 12.8% | 206.5% |
| EMBODIMENT 1 | 13.5% | 31.7% | 234.8% |

| CONTENT OF ACTIVE T CELLS | PERSONNEL A2 BEFORE EXECUTION | PERSONNEL A2 AFTER EXECUTION | PERSONNEL A2 CHANGE RATE = CONTENT OF ACTIVE T CELLS AFTER EXECUTION/ CONTENT OF ACTIVE T CELLS BEFORE EXECUTION |
|---|---|---|---|
| COMPARARTIVE EXAMPLE 1 | 5.3% | 7.9% | 149% |
| EMBODIMENT 1 | 8.1% | 14.6% | 180% |

From TABLE 1, in Comparative Example 1 without using the plant essential oil carrier, the content change rate of the active T cells in personnel A1 is 206.5%, and in Embodiment 1 which the plant essential oil carrier is used, the content change rate of the active T cells in personnel A1 is 234.8%. That is, while the plant essential oil carrier is used in the low-frequency sonic wave health care method, the content of the active T cells in personnel A1 can further increase 28.3%. In Comparative Example 1 without using the plant essential oil carrier, the content change rate of the active T cells in personnel A2 is 149%, and in Embodiment 1 which the plant essential oil carrier is used, the content change rate of the active T cells in personnel A2 is 180%. That is, while the plant essential oil carrier is used in the low-frequency sonic wave health care method, the content of the active T cells in personnel A2 can further increase 31%. Apparently, the low-frequency sonic wave health care method of the present disclosure is highly effective and can maintain long-term health effects.

<Detection Manner and Effect of Experiment 2>

In Embodiments 2, 3, 4 and 5 of the following TABLE 2, the low-frequency sonic wave health care method is executed to the personnels A3, A4, A5 and A6, the predetermined distance D is selected to be 5 cm, the predetermined frequency is selected to be 1.45 Hz, and the low-frequency sonic wave is selected to be the infrasonic. The personnel A3 is a 67-years old man, the personnel A4 is a 64-years old man, the personnel A5 is a 75-years old woman, and the personnel A6 is a 47-years old woman. Before executing the low-frequency sonic wave health care method, blood samples are drawn from personnels A3 to A6 and sent to the medical laboratory for immunological examination to check the concentrations of $NAD^+$, wherein the unit of the concentration of NAD is nanomoles per liter (nmol/L). On the 19-th day after the execution of the low-frequency sonic wave health care method for 2 hours, the blood samples of personnels A3 to A6 are again taken and sent to the medical laboratory for immunological examination, the concentrations of $NAD^+$ of the blood samples are examined in the same way, and the results are recorded in TABLE 2 which is described later.

TABLE 2

| CONCENTRATIONS OF $NAD^+$ (nmol/L) | Personnel A3 | Personnel A4 | Personnel A5 | Personnel A6 |
|---|---|---|---|---|
| BEFORE EXECUTION | 43 | 26 | 23 | 32 |
| AFTER EXECUTION | 116 | 64 | 42 | 53 |
| Change Rate = Concentration After Execution/ Concentration Before Execution | 270% | 246% | 183% | 166% |

From TABLE 2, it can be known the concentration of $NAD^+$ of personnel A3 before the low-frequency sonic wave health care method is executed is 43 nmol/L, the concentration of $NAD^+$ of personnel A3 after the low-frequency sonic wave health care method is executed is 116 nmol/L, and the concentration change rate of personnel A3 is 270%, that is, the concentration of $NAD^+$ of personnel A3 is increased 170%. Similarly, the concentration of $NAD^+$ of personnel A4 before the low-frequency sonic wave health care method is executed is 26 nmol/L, the concentration of $NAD^+$ of personnel A4 after the low-frequency sonic wave health care method is executed is 64 nmol/L, and the concentration change rate of personnel A4 is 246%, that is, the concentration of $NAD^+$ of personnel A4 is increased 146%. The concentration of $NAD^+$ of personnel A5 before the low-frequency sonic wave health care method is executed is 26 nmol/L, the concentration of $NAD^+$ of personnel A5 after the low-frequency sonic wave health care method is executed is 42 nmol/L, and the concentration change rate of personnel A5 is 183%, that is, the concentration of $NAD^+$ of personnel A5 is increased 83%. The concentration of $NAD^+$ of personnel A6 before the low-frequency sonic wave health care method is executed is 32 nmol/L, the concentration of $NAD^+$ of personnel A6 after the low-frequency sonic wave health care method is executed is 53 nmol/L, and the concentration change rate of personnel A6 is 166%, that is, the concentration of $NAD^+$ of personnel A6 is increased 66%. Therefore, the low-frequency sonic wave health care method provided by the present disclosure can promote the increase of $NAD^+$ concentration, and it can increase the $NAD^+$ concentration as long as it is performed once for 2 hours. Obviously, the low-frequency sonic wave health care method of the present disclosure is highly effective and can maintain long-term low-frequency sonic wave health care effects.

Figure 2:
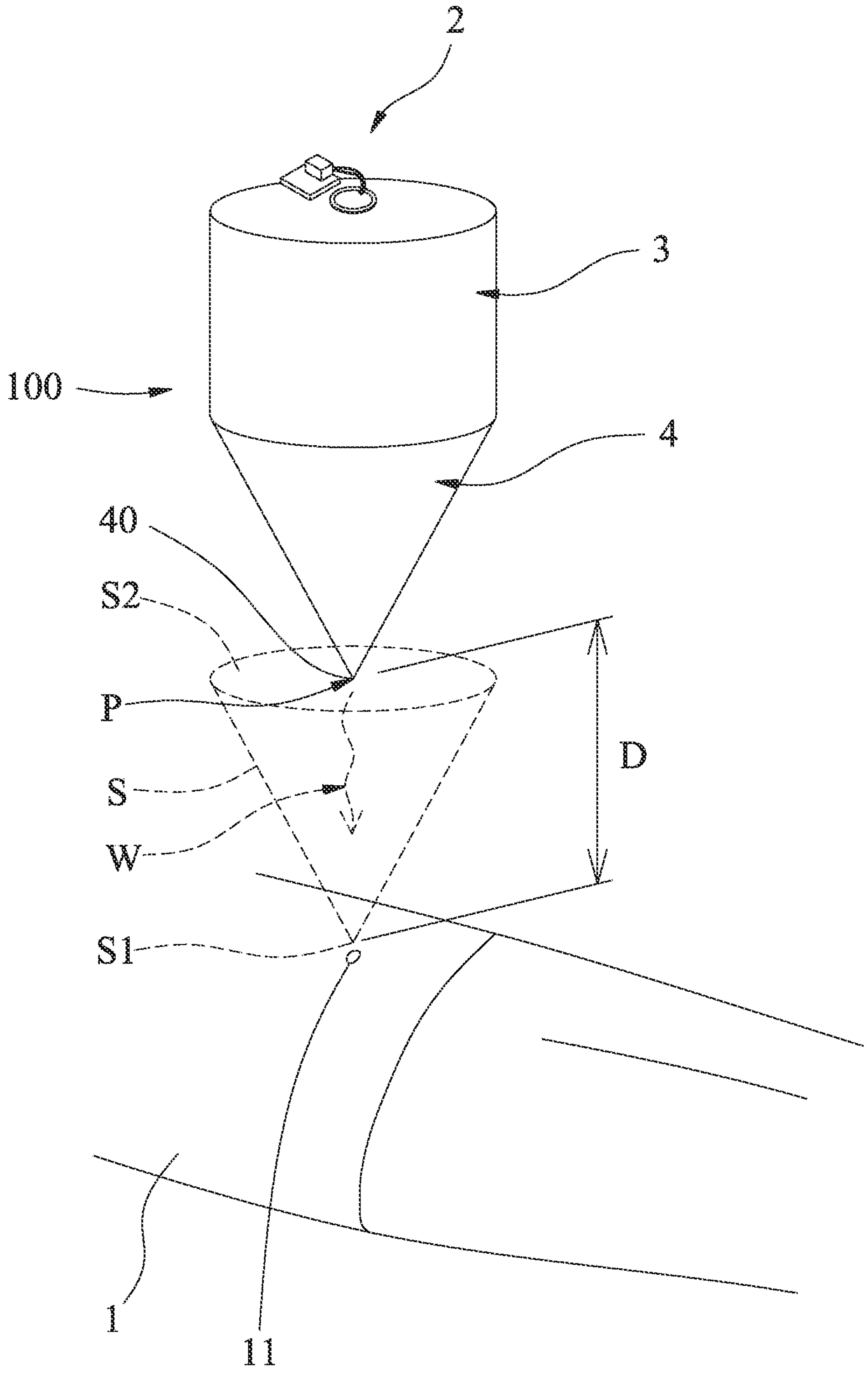
FIG. 2 is a schematic diagram showing a structure of a low-frequency sonic wave health care device when executing a low-frequency sonic wave health care method according to an embodiment of the present disclosure.
Figure 3:
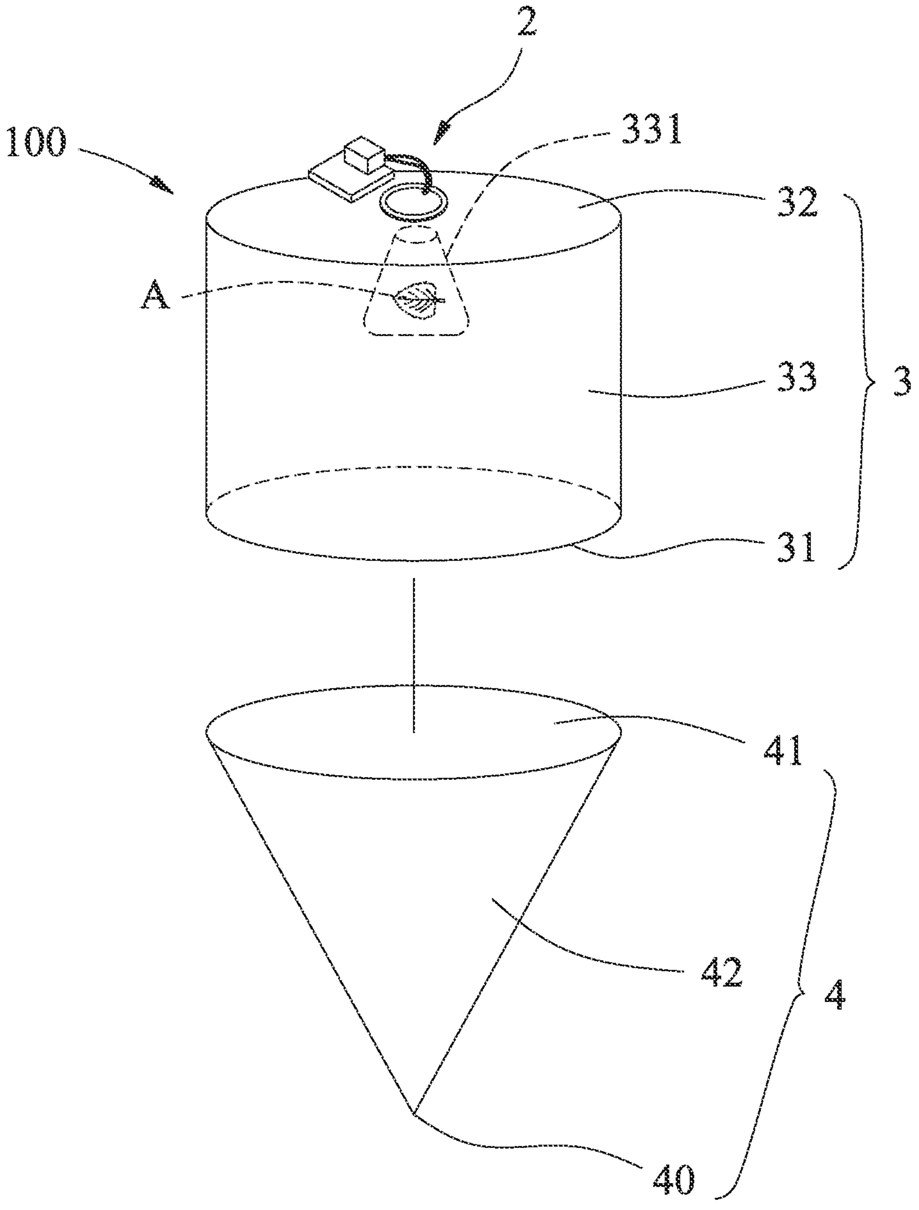
FIG. 3 is a schematic diagram showing a structure of a low-frequency sonic wave health care device according to an embodiment of the present disclosure.

Refer to FIG. 2 and FIG. 3, the present disclosure further provides a low-frequency sonic wave health care device 100 for executing the above low-frequency sonic wave health care method. The low-frequency sonic wave health care device 100 comprises the low-frequency sonic wave emitter 2, a column part 3 and a conical portion 4. The column part 3 is preferably the circular column, the column part 3 has a top surface 31, a bottom surface 32 and a body 33, and the two ends of the body 33 of the column part 3 are respectively connected to the top surface 31 of column part 3 and the bottom surface 32 of column part 3. The column body 33 is provided with an accommodating space 331 recessed from the bottom surface 32 to the top surface 31, and the accommodating space 331 is provided with the plant essential oil carrier A. The conical portion 4 has a vertex 40, a bottom surface 41 and a body 42, wherein two ends of the body 42 of the conical portion 4 are respectively connected to the vertex 40 and the bottom surface 41 of the conical portion 4. The top surface 31 of the column part 3 is correspondingly joined with the bottom surface 41 of the conical portion 4, for example, by welding or screwing. Preferably, the column part 3 and the conical portion 4 are respectively metal column and metal pyramid, respectively. More preferably, the column part 3 and the conical portion 4 are formed integrally, in other words, the top surface 31 of the column part 3, the body 33 of the column part 3, the body 42 of the conical portion 4 and the vertex 40 of the conical portion 4 are formed integrally, i.e., the column part 3 and the conical portion 4 are one-piece part. It is noted that the low-frequency sonic waveguide is formed by combining the column part 3 and the conical portion 4.

The low-frequency sonic wave emitter 2 is connected with the bottom surface 32 of the column part 3, preferably this low-frequency sonic wave emitter 2 is directly connected with the bottom surface 32 of the column part 3, such as this low-frequency sonic wave emitter 2 is welded or screwed to the bottom surface 32 of the column part 3, so when the power supply 21 is activated, the vibration part 22 will generate the low-frequency sonic wave W of the predetermined frequency (please refer to FIG. 1 again). Next, the low-frequency sonic wave W is transmitted to this bottom surface 32 of column part 3 and passes through the plant essential oil carrier A, and then the body 33 of the column part 3 is used to transmit the low-frequency sonic wave W sequentially to the bottom surface 41 of the conical portion 4 and this vertex 40. By using the structure of the conical portion 4 which the bottom surface 41 of the conical portion 4 is designed to be wider than and tapered to the vertex 40, the energy of the low-frequency sonic wave W is more concentrated as it is transmitted toward the vertex 40. Therefore, when the low-frequency sonic wave W is delivered to this vertex 40, the energy of the low-frequency sonic wave W is gathered to the maximum, and then emitted toward the belly button 11 from the vertex 40. The vertex 40 of the conical portion 4 is a tip, and therefore, based on the principle of the tip discharge in electricity, the low-frequency sonic wave W can be concentrated on the vertex 40 to be released and emitted toward the belly button 11. It is noted that, the vertex 40 is located at the predetermined location P at this time.

Figure 4:
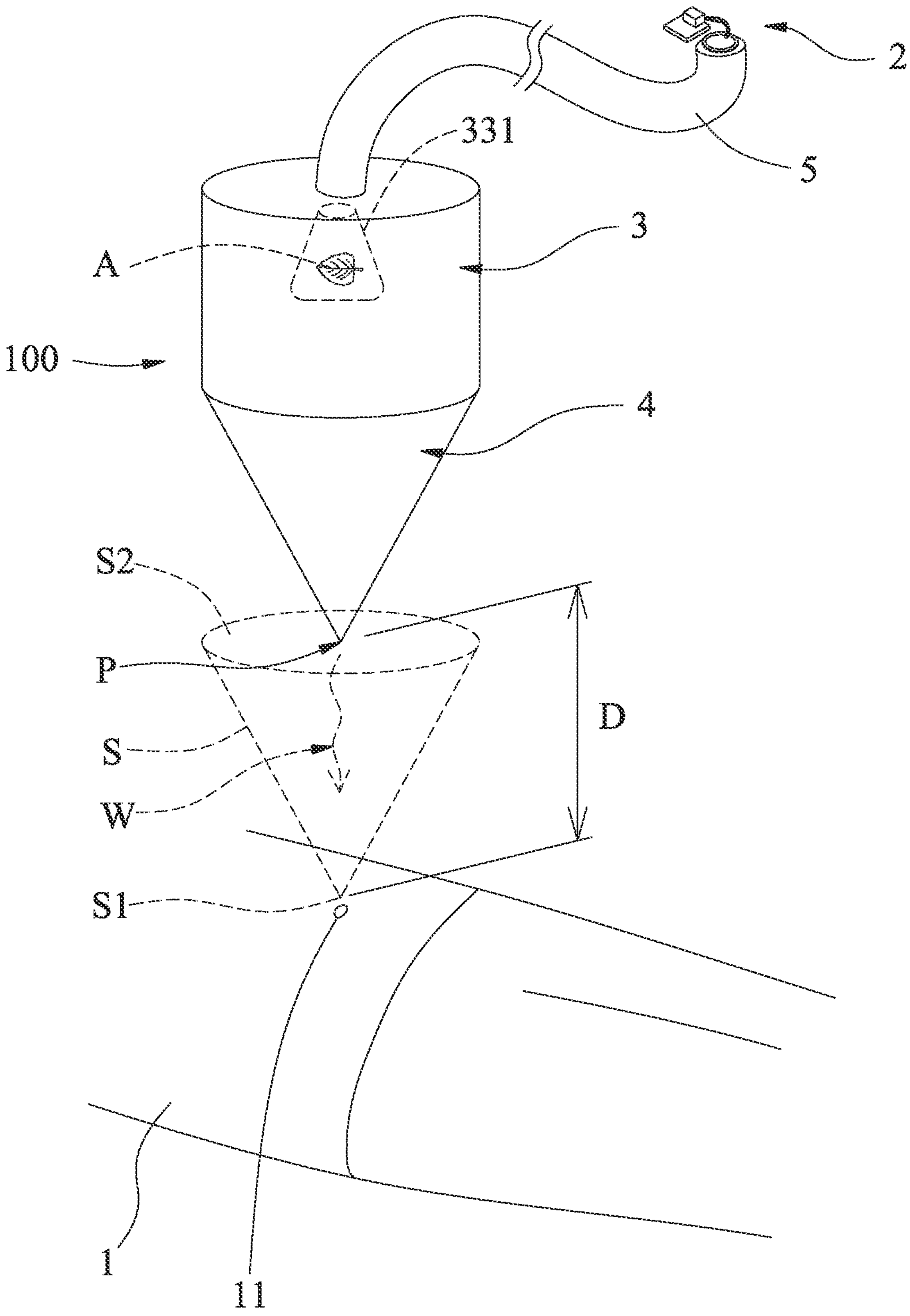
FIG. 4 is a schematic diagram showing a structure of a low-frequency sonic wave health care device with a tube according to an embodiment of the present disclosure.

Refer to FIG. 4, and in another one embodiment, the low-frequency sonic wave emitter 2 is connected to the bottom surface 32 and the accommodating space 331 of the column part 3 via a tube 5. The low-frequency sonic wave W is transmitted to the bottom surface 32 and the accommodating space 331 of the column part 3 via the tube 5. The low-frequency sonic wave W passes through the plant essential oil carrier A, and then passes to the vertex 40 to propagates toward and reaches the belly button 11 as previously described. With the arrangement of the tube 5, the power supply 21 and/or the vibration part 22 of the low-frequency sonic wave emitter 2 can be kept away from the human body, to avoid interference with any electronic device which has implanted in the human body.

Figure 5:
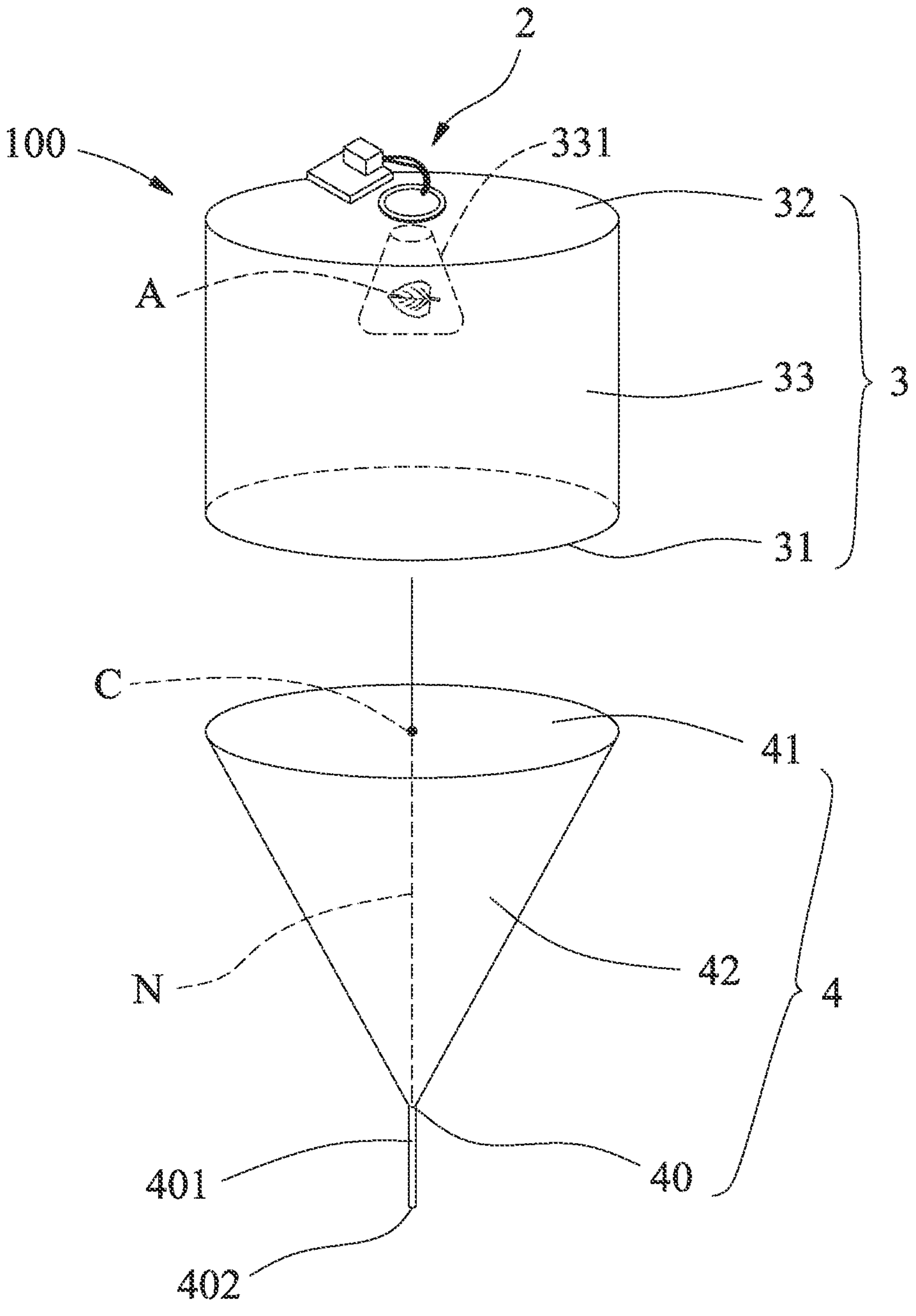
FIG. 5 is a schematic diagram showing a structure of a low-frequency sonic wave health care device with a vertically standing rod according to an embodiment of the present disclosure.

Refer to FIG. 5, and in another one embodiment, the vertex 40 further has a rod 401 being vertically standing and having a longitudinal direction away from the bottom surface 41 of the conical portion 4. Preferably, the rod 401 is a metal rod such as metal silk or metal wire. The longitudinal direction of the rod 401 is coincided with a normal line N of the center C on the bottom surface 41 of the conical portion 4, and the normal line N of the center C on the bottom surface 41 of the conical portion 4 passes extends toward the belly button 11. Therefore, the energy of the low-frequency sonic wave W can be more directed to concentrate on a tip 402 of the rod 401 to be released and emitted toward the belly button 11. Specifically, the tip 402 is located at the predetermined location P at this time.

Figure 6:
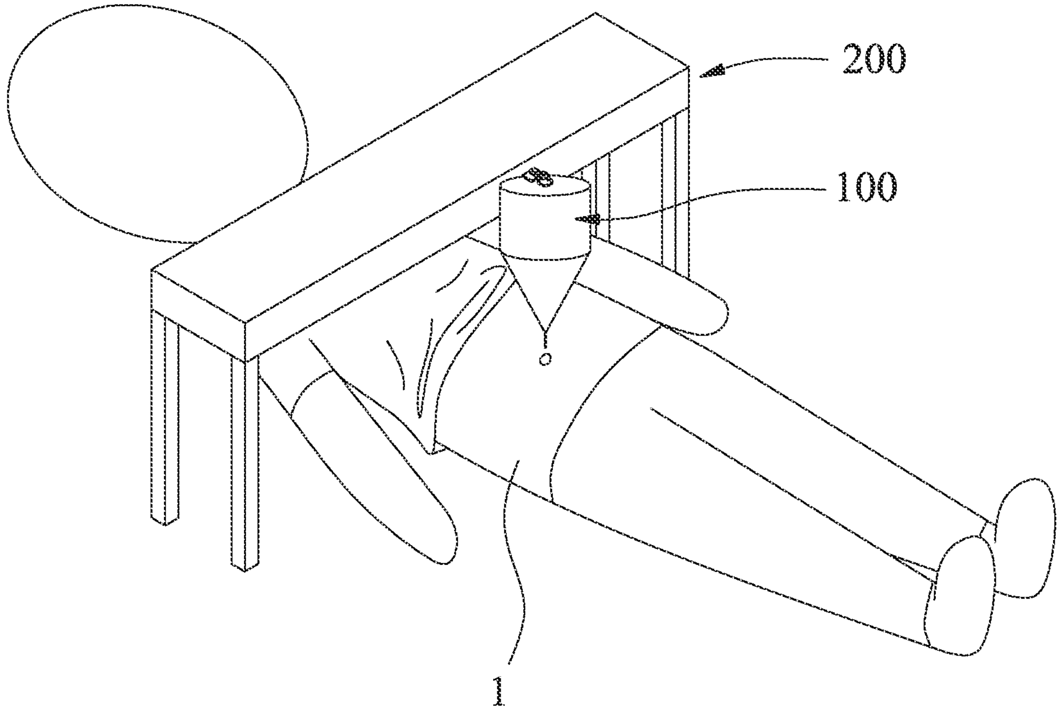
FIG. 6 is a schematic diagram showing a structure of a low-frequency sonic wave health care device installed on or in a frame according to an embodiment of the present disclosure.

Refer to FIG. 6, in another one embodiment, the low-frequency sonic wave health care device 100 is installed in or on a frame 200, the user 1 is lying on the platform (not shown in the drawings), the frame 200 is erected on the platform, and the low-frequency sonic wave health care device 100 is located above the belly button of the user 1. In this way, the user 1 can also get a proper rest during the low-frequency sonic wave health care process.

Figure 7:
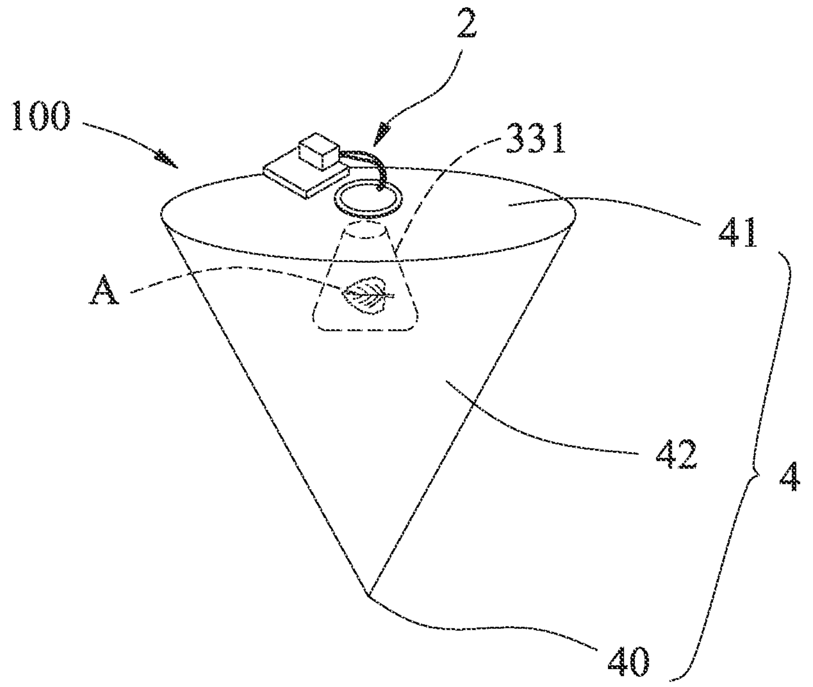
FIG. 7 is a schematic diagram showing a structure that a low-frequency sonic wave emitter of a low-frequency sonic wave health care device is installed on a bottom surface of a conical portion according to an embodiment of the present disclosure.

Refer to FIG. 7, in another one embodiment, the low-frequency sonic wave health care device 100 can also comprises the low-frequency sonic wave emitter 2 and the conical portion 4, but the column part 3 is not included in the low-frequency sonic wave health care device 100. The body 42 is provided with the accommodating space 331 sunken from the bottom surface 41 toward the vertex 40, and the accommodating space 331 is provided with the plant essential oil carrier A. In particular, at this time, the conical portion 4 is the low-frequency sonic waveguide and does not include the column part 3. The low-frequency sonic wave emitter 2 is arranged on the bottom surface 41 of conical portion 4, and the low-frequency sonic wave emitter 2 is connected to the bottom surface 41 of the conical portion 4. Preferably, the low-frequency sonic wave emitter 2 is directly connected to the bottom surface 41 of conical portion, for example, the low-frequency sonic wave emitter 2 is adhered, welded or screwed to the bottom surface 41 of the conical portion 4. Thus, after activating the power supply 21, the vibration part 22 vibrates to generate low-frequency sonic wave W of the predetermined frequency (see FIG. 1 again). Next, the low-frequency sonic wave W is transmitted to the bottom surface 41 of the conical portion 4, and then passes through plant essential oil carrier A. Next, the low-frequency sonic wave W passes toward the vertex 40 of the conical portion 4. By using the pyramid design that the diameter is tapered from the bottom surface 41 to the vertex 40 of the conical portion 4, the energy of the low-frequency sonic wave W is getting concentrated when transmitting to the vertex 40. The conical portion 4 can be a wooden or metal pyramid, and preferably, the conical portion 4 is a one-piece wooden pyramid.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A low-frequency sonic wave health care device, at least comprising:

a low-frequency sonic wave emitter, configured to emit a low-frequency sonic wave with a predetermined frequency;

a low-frequency sonic waveguide; and a plant essential oil carrier, disposed between the low-frequency sonic wave emitter and the low-frequency sonic waveguide;

wherein the low-frequency sonic wave firstly passes through the plant essential oil carrier and then propagates to the low-frequency sonic waveguide, and next, energy of the low-frequency sonic wave is focused in the low-frequency sonic waveguide, and then the low-frequency sonic wave is emitted out from the low-frequency sonic waveguide;

wherein the predetermined frequency is 1.45 Hz;

wherein the plant essential oil carrier is a leaf of *plectranthus amboinicus;* wherein the low-frequency sonic waveguide comprises a column part and a conical portion, and the column part is formed with an accommodating space therein, and the accommodating space accommodates the leaf of *plectranthus amboinicus*; and wherein the low-frequency sonic wave health care device is installed on a frame, and is configured to be located at a predetermined location in front of a belly button of a user with a predetermined distance, and the predetermined distance is 5 cm.

2. A low-frequency sonic wave health care method, comprising:

using a low-frequency sonic wave health care device located at a predetermined location in front of a belly button of a user with a predetermined distance to emit a low-frequency sonic wave with a predetermined frequency, wherein the predetermined distance is 5 cm, and the low-frequency sonic wave health care device comprises:

a low-frequency sonic wave emitter, configured to emit the low-frequency sonic wave;

a low-frequency sonic waveguide; and a plant essential oil carrier, disposed between the low-frequency sonic wave emitter and the low-frequency sonic waveguide;

wherein the low-frequency sonic wave firstly passes through the plant essential oil carrier and then propagates to the low-frequency sonic waveguide, and next, energy of the low-frequency sonic wave is focused in the low-frequency sonic waveguide, and then the low-frequency sonic wave is emitted out from the low-frequency sonic waveguide;

wherein the predetermined frequency is 1.45 Hz;

wherein the plant essential oil carrier is a leaf of *plectranthus amboinicus;* wherein the low-frequency sonic waveguide comprises a column part and a conical portion, and the column part is formed with an accommodating space therein, and the accommodating space accommodates the leaf of *plectranthus amboinicus*; and wherein the low-frequency sonic wave health care device is installed on a frame.

* * * * *